United States Patent
Okamoto et al.

(10) Patent No.: US 7,036,576 B2
(45) Date of Patent: May 2, 2006

(54) AUTOMOTIVE AIR CONDITIONER

(75) Inventors: Tadashi Okamoto, Hiroshima (JP);
Kazuhiko Ohishi, Hiroshima (JP);
Keiichiro Akamatsu, Hiroshima (JP)

(73) Assignee: Japan Climate Systems Corporation, Hiroshima (JP)

( * ) Notice: Subject to any disclaimer, the term of this patent is extended or adjusted under 35 U.S.C. 154(b) by 0 days.

(21) Appl. No.: 10/225,491

(22) Filed: Aug. 22, 2002

(65) Prior Publication Data

US 2003/0056528 A1 Mar. 27, 2003

(30) Foreign Application Priority Data

Aug. 24, 2001 (JP) .............................. 2001-253802

(51) Int. Cl.
*B60H 1/00* (2006.01)
(52) U.S. Cl. ...................................... 165/203; 165/42
(58) Field of Classification Search ................ 165/202, 165/203, 204, 42, 43, 44; 237/28
See application file for complete search history.

(56) References Cited

FOREIGN PATENT DOCUMENTS

| DE | 38 36 991 A1 | * | 5/1990 | .................. 237/28 |
|----|----|----|----|----|
| JP | 4-262914 | * | 9/1992 | |
| JP | 5-58143 A | | 3/1993 | |
| JP | 05-026530 A | | 4/1993 | |
| JP | 5-296553 | | 11/1993 | |
| JP | 6-101933 | * | 4/1994 | .................. 165/42 |
| JP | 09-123748 A | | 5/1997 | |
| JP | 10-147130 | * | 6/1998 | |
| JP | 2001-39144 A | | 2/2001 | |

OTHER PUBLICATIONS

Notice of Reasons of Rejection (Dated Jun. 30, 2003).
Notice of Reasons of Rejection dated Oct. 4, 2005.

* cited by examiner

*Primary Examiner*—Ljiljana Ciric
(74) *Attorney, Agent, or Firm*—Nixon Peabody LLP; Donald R. Studebaker (57) ABSTRACT

An air conditioning unit and an air blowing unit are connected via an intermediate duct. The air blowing unit is provided on the left side of the air conditioning unit in the forward direction of a car. The air conditioning unit includes an air mix damper and a discharge direction switching damper for switching the discharge direction of conditioned air, each driven by a corresponding actuator via a link mechanism associated therewith. The link mechanism and the actuator are provided on a wall part of the air conditioning unit. From the perspective of the forward direction of a car, the link mechanism and actuator are mounted on a left wall part of the casing of the air conditioning unit. On the other hand, the air blowing unit is provided with an actuator for driving an indoor air/outside air switching damper, and the actuator is mounted to a side of a casing of the air blowing unit facing the air conditioning unit. Thus, the resulting air conditioner is reduced in size to reduce its installation space.

9 Claims, 6 Drawing Sheets

AUTOMOTIVE AIR CONDITIONER

BACKGROUND OF THE INVENTION

The present invention relates to automotive air conditioners, and more particularly belongs to the technology of arrangement for disposing driving mechanisms and actuators for dampers provided in an air conditioning unit.

As disclosed in Japanese Unexamined Patent Publication NO. 9-123748, for example, conventionally known as an automotive air conditioner of this type is one provided with: an air conditioning unit, disposed inside an instrument panel of a car roughly in the widthwise center thereof, for accommodating two heat exchangers, i.e., cooling and heating heat exchangers; and an air blowing unit, disposed inside the instrument panel toward a passenger's seat, for blowing air to the air conditioning unit.

The air conditioning unit is provided at a lower end thereof with an air intake through which air from the air blowing unit is introduced. The air introduced through the air intake passes through the cooling and heating heat exchangers, juxtaposed one above the other over the air intake to extend substantially horizontally, and then the air is introduced to the cabin via a duct connected to a portion of the air conditioning unit above the heat exchangers. In this air conditioner, the two heat exchangers are juxtaposed one above the other to reduce the size of the air conditioning unit, thus reducing its installation space.

However, in the exemplary conventional air conditioner, the lower end of the vertically elongated air conditioning unit is located near a floor of the car body, and the air blowing unit needs to be disposed substantially distant from the floor to secure legroom for the passenger's seat. Because of this, an outlet of the air blowing unit and the air intake at the lower end of the air conditioning unit are vertically deviated from each other to a considerable extent; therefore, both the units must be separated from each other in the widthwise direction of the car by a distance equal to or greater than a predetermined distance to smoothly send air from the air blowing unit to the air conditioning unit.

Meanwhile, the air conditioning unit having the functions of a heater and a cooler is provided with a temperature control damper for controlling the temperature of conditioned air and a discharge direction switching damper for switching the discharge direction of conditioned air. Since at least two actuators have to be provided to separately actuate these dampers, it is hard to provide the layout of the actuators and link mechanisms (driving mechanisms).

The present invention has been made in view of the above problems and its object is to further reduce the size of an air conditioner, in which cooling and heating heat exchangers are juxtaposed one above the other and air is sent from an air blowing unit, disposed next to an air conditioning unit and toward a passenger's seat, toward a lower end of the air conditioning unit, by contriving the layout of driving mechanisms and actuators for dampers in the air conditioning unit.

SUMMARY OF THE INVENTION

To achieve the above object, according to a solution of the present invention, attention is given to the fact that an air conditioning unit and an air blowing unit have to be separated from each other in a widthwise direction of a car by a predetermined distance or greater, and thus driving mechanisms and actuators for dampers in the air conditioning unit are arranged in a dead space between these units.

Specifically, an embodiment of the present invention is directed to an automotive air conditioner that comprises: an air conditioning unit disposed inside an instrument panel of a car roughly in the widthwise center thereof; an air blowing unit disposed next to the air conditioning unit and toward a passenger's seat; and an intermediate duct through which air from the air blowing unit is sent to the air conditioning unit, and that allows air, which has been introduced to a lower portion of the air conditioning unit through the intermediate duct, to pass through a cooling heat exchanger and a heating heat exchanger juxtaposed one above the other in the air conditioning unit, thereby providing conditioned air. And the air conditioning unit is provided with: a temperature control damper for controlling the temperature of the conditioned air by changing the rate of the air passing through the heating heat exchanger to the introduced air; and a discharge direction switching damper for switching the discharge direction of conditioned air, and a driving mechanism and an actuator for driving the temperature control damper, and a driving mechanism and an actuator for driving the discharge direction switching damper are provided on a wall part of the air conditioning unit facing the air blowing unit.

In the above-described arrangement, air from the air blowing unit smoothly flows through the intermediate duct, is introduced to the lower portion of the air conditioning unit, and then changes its flow direction upward to pass through the cooling heat exchanger and optionally through the heating heat exchanger. In this case, the temperature control damper is driven by the corresponding actuator via the driving mechanism associated therewith to change the rate of the air passing through the heating heat exchanger to the air having passed through the cooling heat exchanger, thereby controlling the temperature of the conditioned air. The discharge direction of the conditioned air produced in this way is switched by the discharge direction switching damper driven by the corresponding actuator and driving mechanism different from those for driving the temperature control damper, thereby supplying the conditioned air to a desired part of the cabin.

In this arrangement, the driving mechanisms and actuators for the two dampers are all provided on a wall part of the air conditioning unit facing the air blowing unit, and are collectively arranged in a dead space between the air blowing unit and air conditioning unit separated from each other by a distance provided by the intermediate duct. Thus, the air conditioner can be further reduced in size to reduce its installation space. Furthermore, since the two actuators are collectively arranged as described above, it is possible to reduce the number of steps for assembling the air conditioning unit and the number of steps for installing the air conditioning unit into a car body.

In another embodiment of the present invention, the air conditioning unit is connected, at a portion thereof in front of a driver's seat, with a dual-purpose duct through which the conditioning air is guided to the foot of the driver's seat and a backseat. Thus, through the duct, the conditioning air for an occupant in the backseat is discharged from a portion of the air conditioning unit opposite to a portion of the air conditioning unit on which the respective driving mechanisms, for example, are mounted. To be more specific, since, for example, the respective driving mechanisms for the two dampers are both arranged collectively on a side of the air conditioning unit facing the air blowing unit as described above the cross-sectional area of the duct provided at a portion of the air conditioning unit in front of the driver's seat can be increased while the shape of the duct can be determined relatively freely. Thus, it is possible to place the dual-purpose duct while securing an installation space for example, a pedal below the driver's seat.

In still another embodiment of the present invention, the air blowing unit is provided with an indoor air/outside air switching damper for controlling the respective amounts of air to be taken from outside and inside the cabin, and an actuator for driving the indoor air/outside air switching damper is provided on a wall part of the air blowing unit facing the air conditioning unit.

In this arrangement, the actuator for the indoor air/outside air switching damper in the air blowing unit is provided on a wall part of the air blowing unit facing the air conditioning unit, i.e., in the dead space between both the units, in the same way as the driving mechanisms and actuators for the air conditioning unit. Thus, the size of the air conditioner can be further reduced, and the number of steps for assembling each unit and the number of steps for installing each unit into a car body can be reduced.

In still another embodiment of the present invention, the heating heat exchanger is formed smaller in size than the cooling heat exchanger and is disposed in a portion of the air conditioning unit closer to the front of a car body and above the cooling heat exchanger, and a bypass passage, through which air that has passed through the cooling heat exchanger flows to bypass the heating heat exchanger, is provided behind the heating heat exchanger and closer to the rear of the car body.

In this arrangement, the relatively small-sized heating heat exchanger is located above the cooling heat exchanger, and the heating heat exchanger is disposed in a portion of the air conditioning unit closer to the front of the car body. Thus, by providing the bypass passage in a portion of the air conditioning unit closer to the rear of the car body, the overall size of the air conditioning unit can be reduced.

In another embodiment of the present invention, the temperature control damper includes a first damper for controlling the amount of air passing from the cooling heat exchanger through the heating heat exchanger, and a second damper for controlling the amount of air passing through the bypass passage.

In this arrangement, it is possible to change, by the two dampers, the amount of air passing through the heating heat exchanger and the amount of air bypassing the heating heat exchanger. Thus, the temperature condition of the conditioned air can be easily set as desired. In this arrangement, the driving mechanism for driving the two dampers might be increased in size. However, since the driving mechanism is provided in the dead space, an increase in space for installing the air conditioner into the car body will not be caused.

In another embodiment of the invention, the air conditioning unit is further provided, at a bottom wall part of a casing thereof, with a drain having a drain passage through which condensate is discharged, and the drain passage is formed to open at a corner of the bottom wall part closer to the front of the car body and the air blowing unit, extend from the air conditioning unit toward the air blowing unit and pass through a through hoe formed in a dash panel closer to the front of the car body.

In this arrangement, the drain passage of the drain projects, from a surface of projection of the air conditioning unit when viewed in a vertical direction thereof, toward the air blowing unit and then extends toward the front of the car body. Thus, irrespective of the position of the air conditioning unit with respect to the dash panel in a lengthwise direction of the car body, the length of the drain passage extending toward the front of the car body is set so that the drain passage can be easily aligned with the through hole provided in the dash panel.

In still another embodiment of the invention, the air conditioning unit is disposed close to the dash panel of the car body, and a cooler pipe is formed to extend outward from a wall part of the air conditioning unit facing the air blowing unit, bend substantially at a right angle and further extend toward the front of the car body.

In this arrangement, the cooler pipe extends outward from a wall part of the air conditioning unit facing the air blowing unit. Thus, the cooler pipe can be placed utilizing the dead space between the air conditioning unit and the air blowing unit, and the air conditioning unit can be disposed sufficiently close to the dash panel, resulting in an increase in available space in the cabin.

In still another embodiment of the invention, the air conditioning unit is disposed close to the dash panel of the car body, and a heater pipe is formed to extend outward from a wall part of the air conditioning unit facing the air blowing unit, bend substantially at a right angle and further extend toward the front of the car body.

In this arrangement, the cooler pipe can be placed utilizing the dead space between the air conditioning unit and the air blowing unit, and the air conditioning unit can be disposed sufficiently close to the dash panel, resulting in an increase in space to be utilized in the cabin.

DETAILED DESCRIPTION OF THE INVENTION

Hereinafter, an embodiment of the present invention will be described with reference to the drawings.

Figure 1:
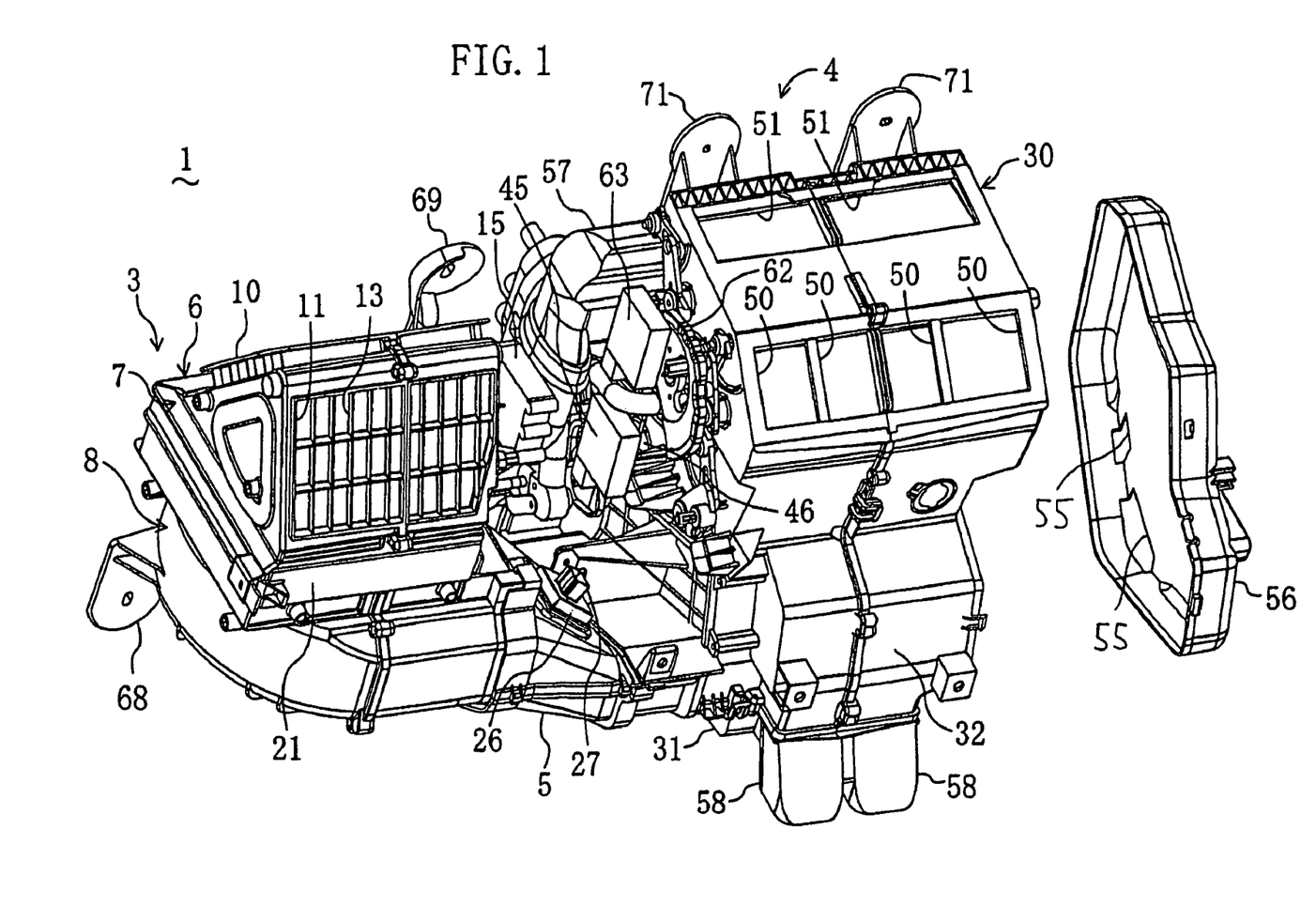
FIG. 1 is a left rear perspective view showing the external appearance of an air conditioner according to an embodiment of the present invention.
Figure 2:
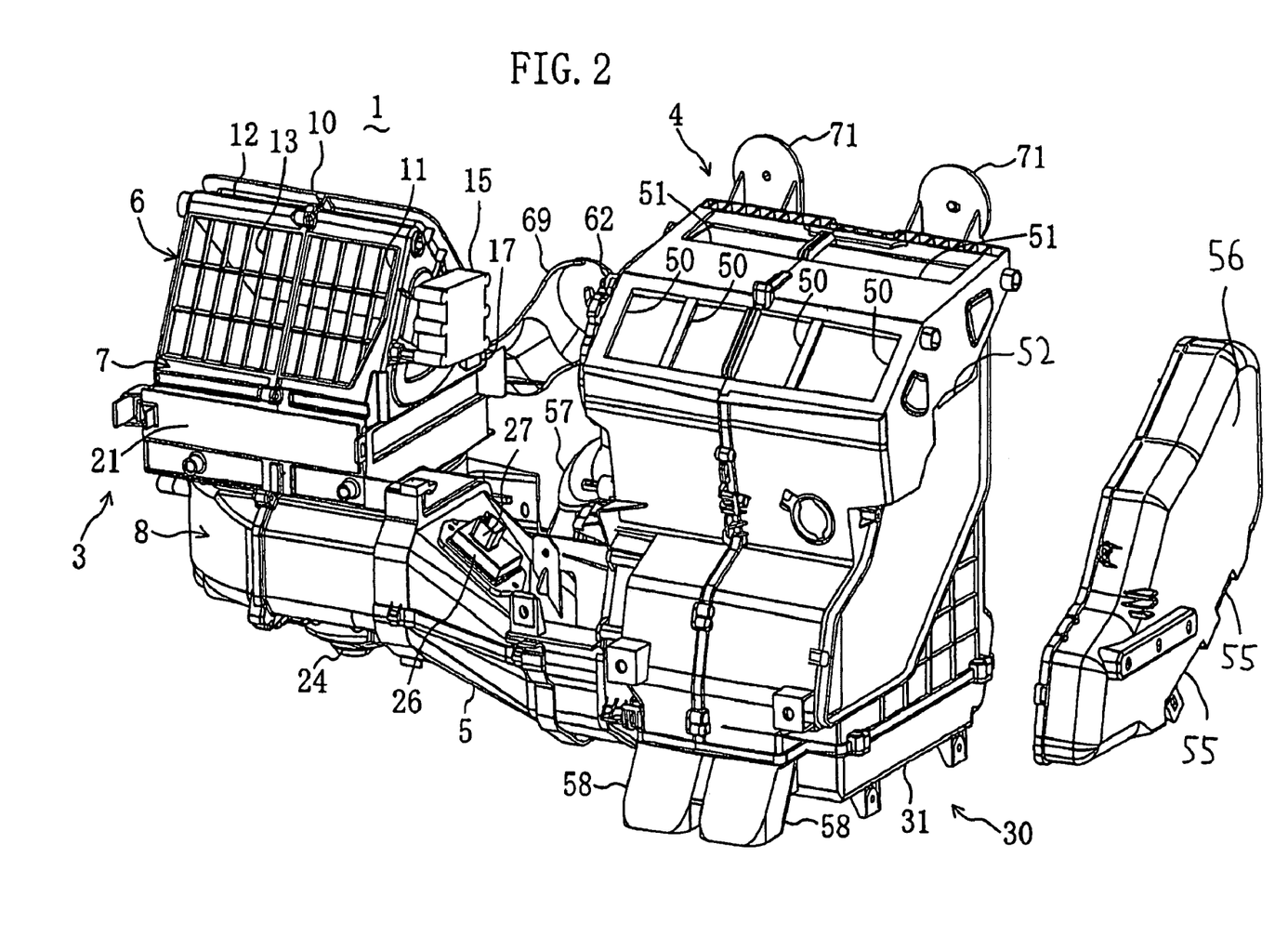
FIG. 2 is a right rear perspective view showing the external appearance of the air conditioner.
Figure 3:
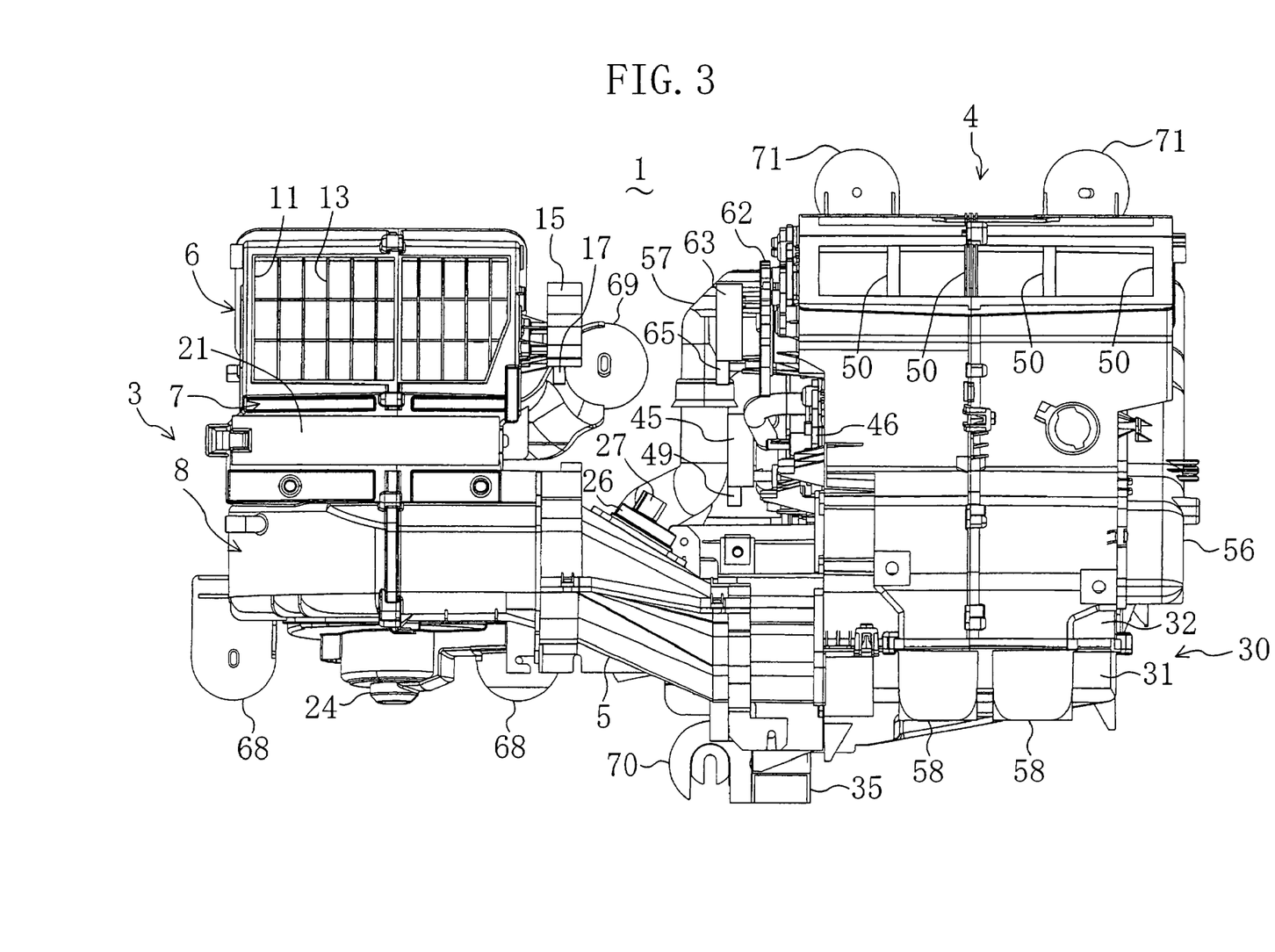
FIG. 3 is a rear view showing the external appearance of the air conditioner.
Figure 4:
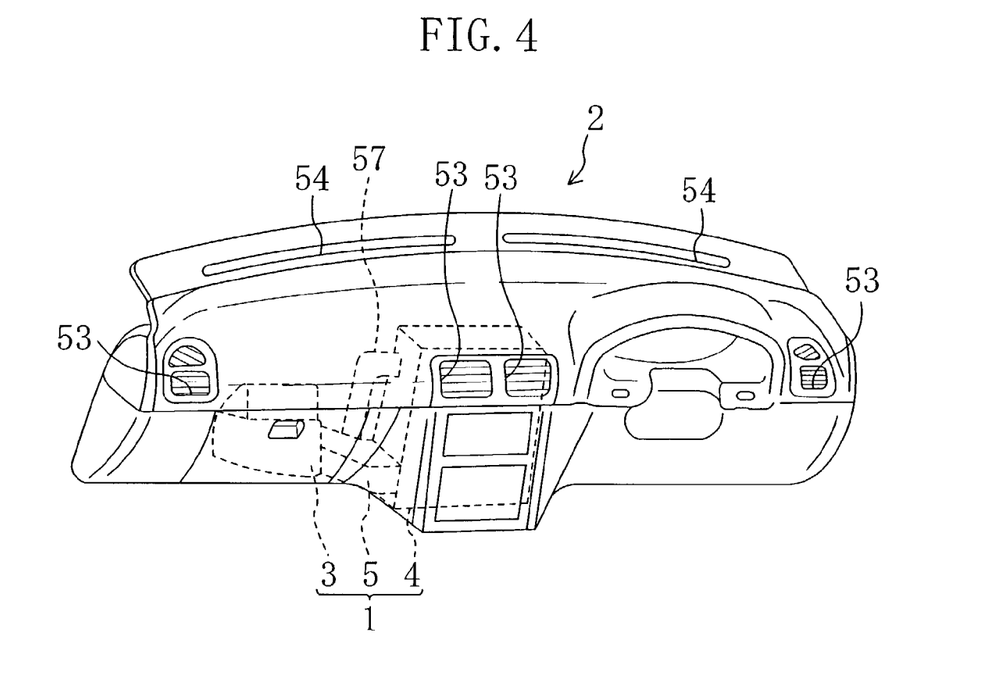
FIG. 4 is a diagram illustrating how the air conditioner is disposed.

FIGS. 1 to 3 each show the external appearance of an air conditioner 1 according to the embodiment of the present invention, and the air conditioner is housed, as shown in FIG. 4, inside an instrument panel 2 provided in the cabin of a car. The car is a so-called right-hand drive car provided at the right-side and left-side of its body with a driver's seat and a passenger's seat, respectively; furthermore, an engine room at the front of the car and a front section of the cabin are partitioned by a dash panel P (shown only in FIG. 6). It should be noted that, in this specification, a car body front side and a car body rear side of the air conditioner 1 are also simply called "the front-side" and "the rear-side", respectively.

As shown in FIG. 3, the air conditioner 1 includes: an air blowing unit 3; an air conditioning unit 4 for cooling air sent from the air blowing unit 3 and then controlling the temperature of the air to supply it to the cabin; and an intermediate duct 5 through which the air from the air blowing unit 3 is sent to the air conditioning unit 4. The air conditioning unit 4 is disposed roughly in the widthwise center of the car, while the air blowing unit 3 is disposed in front of the passenger's seat so as to be separated by a predetermined distance from the air conditioning unit 4 toward the left end of the car body. Furthermore, the lower end of the air blowing unit 3 is positioned above the lower end of the air conditioning unit 4, thus securing wide legroom for an occupant in the passenger's seat.

The air blowing unit 3 includes a casing 6 divided into two parts, right and left, in an approximate widthwise center thereof, and the two parts are combined with each other by a fastener, for example. The casing 6 is provided at an upper part thereof with an air intake section 7 through which air is taken into the air conditioner 1, and is provided at a lower part thereof with an air blowing section 8 for blowing the taken air to the air conditioning unit 4. As shown in FIG. 1, the air intake section 7 is provided at an upper portion thereof with: an outside air intake 10 through which air is taken from outside the cabin via a duct not shown; and an indoor air intake 11 through which air is taken from inside the cabin. Furthermore, an indoor air/outside air switching damper 12, which is actuated to close one of the intakes while opening the other intake, is provided inside the air intake section 7.

To be more specific, the upper portion of the air intake section 7 includes: a front part of rectangular shape inclined so that an upper side thereof is closer to the rear of the car body; and a rear part of rectangular shape inclined so that an upper side thereof is closer to the front of the car body, and upper edges of the front and rear parts are continuous, thus forming a roughly triangular cross section as viewed in the widthwise direction of the car. The outside air intake 10 and indoor air intake 11 are provided at the front and rear parts with rectangular openings, respectively; furthermore, each of the intakes 10, 11 is integrally molded with a grill 13. On the other hand, side parts of the air intake section 7 are formed to connect corresponding lateral ends of the front and rear parts. The indoor air/outside air switching damper 12 is formed into a rectangular shape greater than each of the intakes 10, 11 and has, at an upper edge thereof, a shaft extending in the widthwise direction of the car, and both ends of the shaft are supported at upper ends of a pair of side parts of the air intake section 7.

The indoor air/outside air switching damper 12 is provided at a lower end thereof with a connection (not shown) cutting through the associated side part of the air intake section 7 so that the damper 12 is connected to an output shaft of an actuator 15 attached to the side part. Further, the side part is integrally formed with a boss on which the actuator 15 is fastened with a screw, for example. The actuator 15 is formed to operate in response to a signal sent from an air-conditioning control section (not shown) provided in the car body, and a signal line from the air-conditioning control section is to be connected to a coupler 17 for the actuator 15.

Furthermore, when the indoor air/outside air switching damper 12 is rotated about its shaft by the actuator 15 to assume a position for fully opening the outdoor air intake 10, the indoor air intake 11 is fully closed to put the air intake section 7 in an outdoor air intake mode in which only outdoor air is taken; on the other hand, when the indoor air/outside air switching damper 12 is rotated reversely from the above state to assume a position for fully closing the outdoor air intake 10, the indoor air intake 11 is fully opened to put the air intake section 7 in an indoor air circulation mode.

Figure 5:
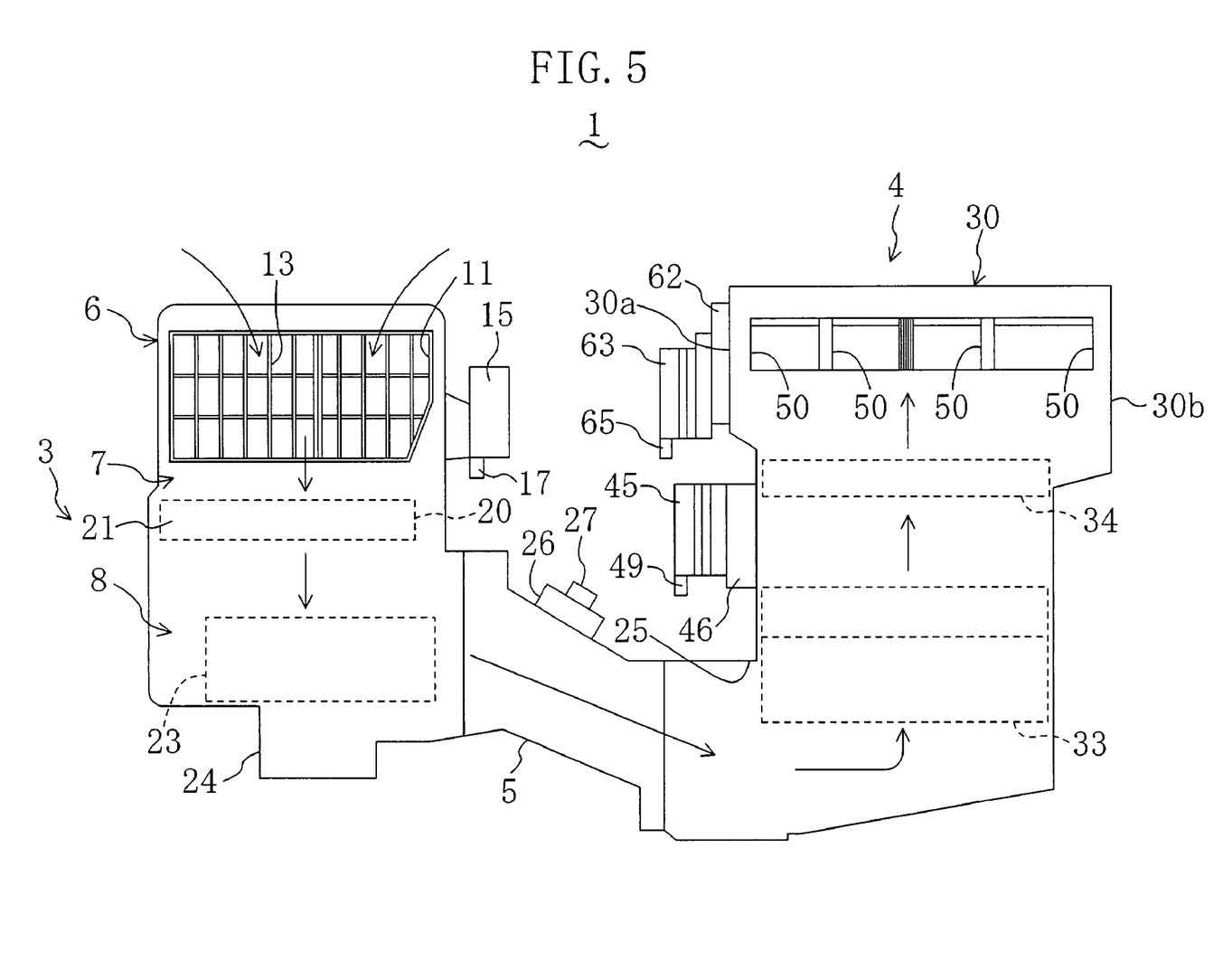
FIG. 5 is a diagram showing the structure of the air conditioner and corresponding to FIG. 3.

Meanwhile, as shown in FIG. 5, the air intake section 7 is provided at a lower portion thereof with a filter disposition part 21 in which a filter 20 for filtering out intake air is disposed, and although not shown, the filter disposition part 21 is provided at a portion thereof closer to the rear of the car body with an opening, so that the filter 20 can be changed through this opening. Provided below the filter disposition part 21 is the air blowing section 8 in which a centrifugal multi-blade fan as an air blowing fan 23 is provided such that its rotating shaft extends vertically. Furthermore, a fan drive motor 24 is provided under the air blowing fan 23. As indicated by the arrows in FIG. 5, due to the rotation of the air blowing fan 23, air is taken through the upper portion of the air intake section 7, allowed to pass through the filter 20, and then introduced to the air blowing section 8.

The air blowing section 8 is formed at a right wall part thereof with an opening and is thus connected with a left end of the intermediate duct 5. The intermediate duct 5 is formed to extend obliquely downward from its left end toward the lower end of the air conditioning unit, and is communicated at its right end with the inside of the air conditioning unit 4 via an opening 25 formed at a lower end of a casing for the air conditioning unit 4. That is, the air blowing unit 3 and the air conditioning unit 4 are separated from each other by a distance provided by the intermediate duct 5; thus, the air sent from the air blowing unit 3 passes through the intermediate duct 5 and is smoothly sent to the air conditioning unit 4 as indicated by the arrows in FIG. 5.

In addition, as shown in FIG. 2, the intermediate duct 5 has a roughly rectangular cross section elongated in the lengthwise direction of the car body, and is provided at an upper wall thereof with a control circuit 26 for changing the number of rotations of the fan drive motor 24. The control circuit 26 is provided at an upper end thereof with a coupler 27 for making a connection with a connector from the air-conditioning control section.

Figure 6:
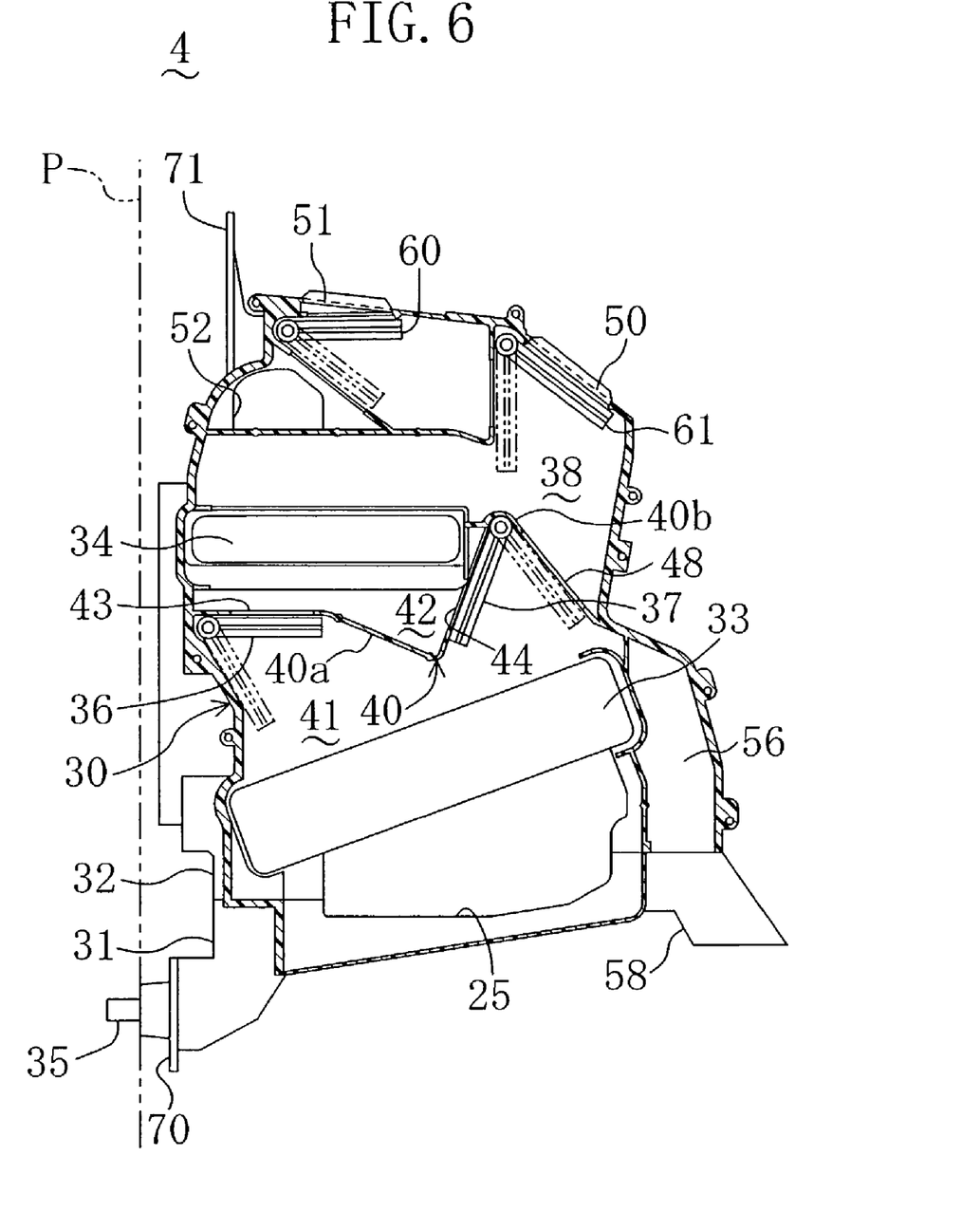
FIG. 6 is a cross-sectional view showing the internal structure of an air conditioning unit.

The air conditioning unit 4 is vertically elongated overall, and includes a casing 30 formed into a rectangular box shape having the size greater than the casing 6 of the air blowing unit 3. The casing 30 is divided into a bottom wall part 31 and a main body part 32 located upwardly of the bottom wall part 31; further more, the main body part 32 is divided, in a manner similar to the air blowing unit 3, into two parts in an approximate widthwise center thereof. As shown in FIG. 6, the casing 30 is provided internally with an evaporator 33 as a component of a refrigeration cycle located at a higher level than the opening 25 to which the intermediate duct 5 is connected; furthermore, a heater core 34 is provided above the evaporator 33. In addition, the casing 30 of the air conditioning unit 4 is provided at an upper portion thereof with a plurality of outlets through which conditioned air is discharged, and as indicated by the arrows in FIG. 5, air flow from the air blowing unit 3 is directed upward in the air conditioning unit 4.

The evaporator 33 is a cooling heat exchanger for cooling air from the air blowing unit 3 and is formed by stacking multiple tubes, each formed of a thin plate of metal such as aluminum, to extend in the same direction, and interposing corrugated fins, each likewise formed of a thin metal plate, between the adjacent tubes. Through the tubes of the evaporator 33, low-temperature refrigerant produced by the refrigeration cycle is circulated, thus cooling air passing through the evaporator 33. To be more specific, although not shown, the evaporator 33 is provided at both sides of its tubes with tanks communicating with the tubes, and one of the tanks is partitioned into an inflow tank portion and an outflow tank portion by a divider provided at the center of the tank in a stacking direction of the tubes. Refrigerant having flowed into the inflow tank portion flows into the other tank through the upstream side tubes connected to the inflow tank portion, and then the refrigerant flows from the other tank through the downstream side tubes to the outflow tank portion of said one of the tanks.

The evaporator 33 is disposed to allow the tubes to extend in the lengthwise direction of the car body and to incline such that a portion of the evaporator 33 closer to the rear of the car body is located at a higher position, thus allowing all air from the air blowing unit 3 to pass through the evaporator 33. The inflow tank portion and outflow tank portion of the evaporator 33 are each connected with a cooler pipe (not shown), and each cooler pipe is molded to extend from a left wall part 30a (shown only in FIG. 5) of the casing 30 of the air conditioning unit 4 to the outside of the casing 30 and then further extend toward the front of the car body. Accordingly, cooler pipes can be arranged utilizing a space between the air conditioning unit 4 and the air blowing unit 3, and concurrently, the air conditioning unit 4 can be disposed sufficiently close to the dash panel P, thus increasing available space in the cabin.

Condensate produced in the evaporator 33 during cooling of air therethrough is discharged outside of the car through a drain 35 provided at the bottom wall part 31 of the casing 30. The drain 35 includes, at a left portion of the bottom wall part 31 closer to the front end of the car body, a drain passage (not shown) formed integrally with the bottom wall part 31. The drain passage is provided at its upstream end with an opening to communicate with the inside of the casing 30, and extends from its upstream end to project toward the left end of the car body beyond the left wall part 30a of the casing 30. Furthermore, the downstream portion of the drain passage extends toward the front of the car body like the cooler pipes and passes through a through hole (not shown) formed in the dash panel P, and its downstream end opens into the engine room. Thus, the drain 35 projects, from a surface of projection of the air conditioning unit 4 when viewed in a vertical direction thereof, toward the air blowing unit 3 and then extends toward the front of the car body. Accordingly, irrespective of the position of the air conditioning unit 4 with respect to the dash panel P in the lengthwise direction of the car body, the length of the drain passage extending toward the front of the car body is set so that the drain passage can be opened into the engine room.

On the other hand, the heater core 34 is a heating heat exchanger for heating air that has been passed through the evaporator 33, and is formed by stacked tubes and fins like the evaporator 33. The heater core 34 is formed smaller in size than the evaporator 33 and its position is deviated to a portion of the casing 30 closer to the front of the car body. Through the tubes of the heater core 34, high-temperature cooling water from the engine is circulated, thus heating air passing through the heater core 34. The heater core 34 is provided with heater pipes (not shown) through which engine cooling water flows in and flows out in the same way as the cooler pipes of the evaporator 33, and each heater pipe is molded to extend outward from the left wall part 30a of the casing 30 and then further extend toward the front of the car body. Accordingly, since each heater pipe is located above the intermediate duct 5, an occupant in the passenger's seat will not touch the heater pipes. Thus, it is possible to omit attaching a heat insulator to the heater pipes. Further, the heater pipes can be arranged utilizing the space between the air conditioning unit 4 and the air blowing unit 3 in the same way as the cooler pipes, and concurrently, the air conditioning unit 4 can be disposed sufficiently close to the dash panel P, thus increasing available space in the cabin.

Between the evaporator 33 and the heater core 34, two air mix dampers 36, 37 (temperature control dampers) for controlling the temperature of conditioned air are provided. The temperature control by the air mix dampers 36, 37 is carried out by changing the ratio between the amount of air passing through the heater core 34 after having passed through the evaporator 33 and the amount of air passing through a bypass passage 38, through which the air bypasses the heater core 34, after having passed through the evaporator 33.

To be more specific, as shown in FIG. 6, the inner space of the casing 30 of the air conditioning unit 4 is partitioned, by a partition wall 40 integrally formed with the inside of the casing 30, into a disposition space 41 for the evaporator 33 and a disposition space 42 for the heater core 34. As shown in FIG. 6, when viewed in the widthwise direction of the car, the partition wall 40 includes; a front-side partition wall 40a that is located at a portion thereof closer to the front of the car body and extends substantially horizontally; and a rear-side partition wall 40b that is located at a portion thereof closer to the rear of the car body and is formed into an inverted V-shape. The front-side partition wall 40a and the rear-side partition wall 40b are provided with openings 43 and 44, respectively, through which the evaporator disposition space 41 and the heater core disposition space 42 are communicated with each other, and the openings 43, 44 are opened and closed by the air mix dampers 36, 37, respectively. Furthermore, the rear-side partition wall 40b of the partition wall 40 is provided with an opening 48 through which the bypass passage 38, extending substantially vertically to the rear of the heater core disposition space 42, is communicated with the evaporator disposition space 41. Since the bypass passage 38 is provided behind the relatively small-sized heater core 34 located above the evaporator 33 and closer to the rear of the car body, the casing 30 does not have to be largely expanded toward the rear of the car body, thus reducing the overall size of the air conditioning unit 4.

The two air mix dampers 36, 37 each have a shaft extending in the widthwise direction of the car like the indoor air/outside air switching damper 12, and both ends of each shaft are supported to the casing 30. Shaft ends of the air mix dampers 36, 37 toward the left of the car body are connected, via a link mechanism 46, with an output shaft of an actuator 45 provided on the left wall part 30a of the casing 30. Like the actuator 15 for the indoor air/outside air switching damper 12, the actuator 45 is fixed to a boss extended from the left wall part 30a of the casing.

The two air mix dampers 36, 37 are moved conjointly through the link mechanism 46 described above, and can rotate from positions for fully opening the front-side and rear-side openings 43, 44 to positions for fully closing the openings 43, 44, respectively. In this case, the rear-side air mix damper 37, when rotated to assume a position for fully opening the rear-side opening 44, fully closes the opening 48 at an upstream end of the bypass passage 38, thus allowing substantially all air to pass through the heater core 34. Since the two air mix dampers 36, 37 control the amount of air in this manner, the temperature condition of conditioned air can be easily set as desired. Like the actuator 15 for the indoor air/outdoor air switching damper 12, the actuator 45 for the air mix dampers 36, 37 has a coupler 49 (shown only in FIG. 3 and FIG. 5) to which a signal line from the air-conditioning control section is to be connected.

It should be noted that, although not shown, the evaporator 33 is provided with a temperature sensor for detecting the temperature of a surface of the evaporator 33, while the heater core 34 is provided with a water temperature sensor for detecting the temperature of engine cooling water in the heater core 34. Each signal line from the sensors extends to pass through the left wall part 30a of the air conditioning unit 4 and is connected to the air-conditioning control section.

Further, the upper portion of the casing 30 of the air conditioning unit 4 is formed, at an inclined part thereof closer to the rear of the car body, with vent outlets 50, 50, . . . , and is formed, at a substantially horizontal part thereof closer to the front of the car body, with defrost outlets 51, 51, . . . . Furthermore, the upper portion of the casing 30 is formed, at the left wall part 30a and right wall part 30b (shown only in FIG. 5), each with a foot outlet 52 (only one on the right is shown in FIG. 6). Since the vent outlets 50, 50, . . . are connected via vent ducts (not shown) to vent grills 53, 53, . . . provided in the instrument panel 2 shown in FIG. 4, conditioned air from each vent outlet 50 is mainly discharged to the bust of the car's occupant. On the other hand, since the defrost outlets 51, 51 are connected via defrost ducts (not shown) to defrost grills 54, 54 provided in a front end of the instrument panel 2, conditioned air from each defrost outlet 51 is discharged toward an inner face of a front window. In addition, the right and left foot outlets 52, 52 are connected with downwardly extending ducts 56, 57, respectively, and both the ducts 56, 57 open near the legs of the driver and passenger under the instrument panel 2, respectively; thus, conditioned air from the foot outlets 52, 52 is discharged to the legs of the car's occupants.

Of the ducts 56, 57 connected to the foot outlets 52, 52, the duct 56 in front of the driver's seat is provided integrally with the casing 30 to run around from the right wall part 30b of the casing 30 to a rear wall part of the casing 30, has a relatively large cross section, and is formed as a dual-purpose duct also used for a backseat through which conditioned air for the occupant in the backseat also passes. A portion of the dual-purpose duct 56 corresponding to the casing right wall part 30b is formed at a front-side part thereof with openings 55, 55 through which conditioned air is discharged to the driver as described above, and a portion of the dual-purpose duct 56 corresponding to rear wall part of the casing 30 is formed at a lower end thereof with connections 58, 58 to be connected with an upper end of a floor duct (not shown) through which conditioned air for the occupant in the backseat is guided.

Furthermore, within the casing 30 of the air conditioning unit 4, provided in the same way as the air mix dampers 36, 37 are two discharge direction switching dampers 60, 61 for changing the discharge direction of conditioned air by opening and closing the outlets 50, 51, 52. The dampers 60, 61 are actuated by a link mechanism 62 provided on the left wall part 30a of the casing 30 of the air conditioning unit 4 and an actuator 63 fixed to a boss on the left wall part 30a.

Of the discharge direction switching dampers 60, 61, the front-side one is a defrost damper 60 for opening and closing the defrost outlets 51, 51, and the rear-side one is a vent damper 61 for opening and closing the vent outlets 50, 50,. The dampers 60, 61 are moved conjointly through the link mechanism 62 and are each driven by the actuator 63 to open the associated outlets in accordance with respective discharge modes. That is, the air conditioning unit 4 can change the opened/closed state of the two dampers 60, 61 to switch its discharge mode among, for example, a vent mode, a defrost mode, a foot mode, and a bi-level mode in which conditioned air is discharged from the vent and foot outlets 50, 52. It should be noted that, like the actuator 15 for the indoor air/outside air switching damper 12, the actuator 63 for the discharge direction switching dampers 60, 61 also has a coupler 65 (shown only in FIG. 3 and FIG. 5) to which a signal line from the air-conditioning control section is connected.

As described above, since the link mechanisms 46, 62 and actuators 45, 63 for the dampers 36, 37, 60, 61 in the air conditioning unit 4 are collectively arranged on the left wall part 30a of the air conditioning unit 4, these link mechanisms and actuators can be mounted from one direction at a time during the assembly of the air conditioning unit 4.

Next, in describing how the air conditioner 1 is installed into the car body, first, fittings used for the air blowing unit 3 and the air conditioning unit 4 will be described. The air blowing unit 3 is provided with brackets 68, 68 which make a pair at both sides, right and left, of the air blowing section 8, and is also provided with a bracket 69 obliquely extending from the right of the filter disposition space 21 toward the right of the car body. On the other hand, the fittings for the air conditioning unit 4 include a flange 70 formed integrally with the drain 35, and flanges 71, 71 provided to make a pair at both sides, right and left, of the upper portion of the casing 30.

Further, the fittings 68 to 71 for the air blowing unit 3 and air conditioning unit 4 are each formed with a through hole, and although not shown, the dash panel P is attached with stud bolts, each corresponding to the position of the associated through hole. Furthermore, the dash panel P is formed with through holes corresponding to the positions at which the cooler pipes, heater pipes, and drain passage are provided. At this point, when the air conditioner 1 is positioned in the car body so as to insert the stud bolts into the associated through holes in the fittings 68 to 71 for the units 3, 4, the cooler pipes and heater pipes are allowed to reach the engine room via the corresponding through holes provided in the dash panel P. In this state, a nut is screwed onto each stud bolt, thus firmly fixing the air conditioner 1 to the car body. Furthermore, each of the pipes is connected with piping in the engine room, and the drain passage is connected with a drain pipe.

Accordingly, in the automotive air conditioner according to the present embodiment, air from the air blowing unit 3 is sent to the air conditioning unit 4 via the intermediate duct 5, the link mechanisms 46, 62 and actuators 45, 63 for the air mix dampers 36, 37 and discharge direction switching dampers 60, 61 in the air conditioning unit 4 are mounted to a side of the air conditioning unit casing 30 facing the air blowing unit 3, and the actuator 15 for the indoor air/outdoor air switching damper 12 in the air blowing unit 3 is mounted to a side of the air blowing unit casing 6 facing the air conditioning unit 4. Thus, the components 15, 45, 46, 62, 63 such as actuators can be placed within a dead space above the intermediate duct 5, and the air conditioner 1 can be reduced in size, thereby reducing its installation space. Also, since the link mechanisms 46, 62 and actuators 45, 63 can be assembled to the air conditioning unit casing 30 from one direction, the number of steps for the assembly of the air conditioning unit 4 can be reduced.

Further, the connections 17, 27, 49, 65 for connecting the actuators 15, 45, 63 for the dampers 12, 36, 37, 60, 61, the temperature sensor of the evaporator 33, the water temperature sensor of the heater core 34, and the control circuit 26 of the air blowing fan 23 to the air-conditioning control section are concentrated between the air blowing unit 3 and the air conditioning unit 4. Thus, it is possible to reduce the number of steps for installing the air conditioner 1 into the car body.

Furthermore, the link mechanisms 46, 62 and actuators 45, 63 are not provided on the right wall part 30b of the air conditioning unit 4, i.e., in front of the driver's seat. Thus, the cross-sectional area of the duct 56 toward the driver's seat can be widened and the shape of the duct 56 can be freely determined. As a result, a sufficient amount of air to be discharged to the occupants in the driver's seat and backseat can be secured only through the duct 56. In addition, space in the vicinity of the foot of the driver's seat can be increased.

(Other Embodiments)

It should be noted that the present invention is not limited to the above-described embodiment and embraces various other embodiments. Specifically, although the description has been made about a right-hand drive car, the present invention is also applicable to a left-hand drive car. That is, the air blowing unit 3 may be disposed at the right-side portion of the car body, in which case, like the above-described embodiment, the link mechanisms 46, 62 and actuators 45, 63 for the air conditioning unit 4 may be mounted to a side of the air conditioning unit 4 facing the air blowing unit 3, and the actuator 15 for the air blowing unit 3 may be mounted to a side of the air blowing unit 3 facing the air conditioning unit 4.

What is claimed is:

1. An automotive air conditioner, comprising: an air conditioning unit disposed inside an instrument panel of a car substantially in the widthwise center of the car; an air blowing unit disposed next to the air conditioning unit and toward a passenger's seat, an intermediate duct through which air from the air blowing unit is sent to the air conditioning unit, wherein the air is introduced to a lower portion of the air conditioning unit through the intermediate duct to pass through a cooling heat exchanger and a heating heat exchanger juxtaposed one above the other in the air conditioning unit, thereby providing conditioned air;
   a temperature control damper for controlling the temperature of the conditioned air by changing the rate of the air passing through the heating heat exchanger to the introduced air;
   a discharge direction switching damper for switching the discharge direction of conditioned air,
   a first driving mechanism and a first actuator for driving the temperature control damper; and a second driving mechanism and a second actuator for driving the discharge direction switching damper provided on a wall part of the air conditioning unit facing the air blowing unit; and
   a discharge outlet for the conditioned air formed in an upper portion of the air conditioning unit,
   the discharge outlet is connected to an integrated duct which integrates with the wall part of the air conditioning unit on the driver's seat side and extends to the lower portion of the wall part, and
   wherein the conditioned air is guided to the foot of the driver's seat through the duct.

2. The automotive air conditioner according to claim 1, wherein the integrated duct is a dual-purpose duct through which the conditioned air is guided to the foot of the driver's seat and a backseat.

3. The automotive air conditioner according to claim 2, wherein the air blowing unit is provided with an indoor air/outside air switching damper for controlling the respective amounts of air to be taken from outside and inside the cabin of the car, and
   an actuator for driving the indoor air/outside air switching damper is provided on a wall part of the air blowing unit facing the air conditioning unit.

4. The automotive air conditioner according to claim 3, wherein the heating heat exchanger is formed smaller in size than the cooling heat exchanger and is disposed in a portion of the air conditioning unit closer to the front of a car body and above the cooling heat exchanger, and the air conditioner further comprises:
   a bypass passage, through which air that has passed through the cooling heat exchanger flows to bypass the heating heat exchanger, provided behind the heating heat exchanger and closer to the rear of the car body.

5. The automotive air conditioner according to claim 4, wherein the temperature control damper includes a first damper for controlling the amount of air passing from the cooling heat exchanger through the heating heat exchanger, and a second damper for controlling the amount of air passing through the bypass passage.

6. The automotive air conditioner to claim 1, wherein the air conditioning unit is further provided, at a bottom wall part of a casing thereof, with a drain having a drain passage through which condensate is discharged, and the drain passage is formed to open at a corner of the bottom wall part positioned toward the front of the car body and the air blowing unit, the drain extends from the air conditioning unit toward the air blowing unit and pass through a through hole formed in a dash panel closer to the front of the car body.

7. The automotive air conditioner according to claim 1, wherein the air conditioning unit is disposed in proximity to the dash panel of the car body, and
   a cooler pipe extends outward from a wall part of the air conditioning unit facing the air blowing unit, bends substantially at a right angle and further extends toward the front of the car body.

8. The automotive air conditioner according to claim 1, wherein the air conditioning unit is disposed in proximity to the dash panel of the car body, and
   a heater pipe extends outward from a wall part of the air conditioning unit facing the air blowing unit, bends substantially at a right angle and further extends toward the front of the car body.

9. The automotive air conditioner according to claim 1, wherein the cooling heat exchanger is disposed in a lower portion within the air conditioning unit,
   the heating heat exchanger is disposed in an upper portion of the cooling heat exchanger and in a portion of the air conditioning unit position toward the front of the car,
   the second driving mechanism and the second actuator for driving the discharge direction switching damper is provided near the upper portion of the wall part of the air conditioning unit facing the air blowing unit,
   the first driving mechanism and the first actuator for driving the temperature control damper is provided below and separated from the second driving mechanism and the second actuator for driving the discharge direction switching damper,
   the discharge outlet for the conditioned air is formed on the wall part of the air conditioning unit on the driver's seat side and at the front of the car, the duct is a dual-purpose duct through which the conditioned air is guided to a back seat, and an upstream end of the dual-purpose duct is connected to the discharge outlet, and the cross-sectional area of a passage of the dual-purpose duct is larger than the discharge outlet, the dual-purpose duct extents linearly toward the lower portion of the air conditioning unit and the back of the car, and the dual-purpose duct is formed across a region that is overlapped by the second driving mechanism and the second actuator for driving the discharge direction switching damper and the first driving mechanism and the first actuator for driving the temperature control damper, when viewed from the side of the car.

* * * * *

UNITED STATES PATENT AND TRADEMARK OFFICE
CERTIFICATE OF CORRECTION

PATENT NO. : 7,036,576 B2 Page 1 of 1
APPLICATION NO. : 10/225491
DATED : May 2, 2006
INVENTOR(S) : Tadashi Okamoto et al.

It is certified that error appears in the above-identified patent and that said Letters Patent is hereby corrected as shown below:

Claim 9, column 13, line 7, "extents" should read --extends--.

Signed and Sealed this

Nineteenth Day of December, 2006

JON W. DUDAS
*Director of the United States Patent and Trademark Office*